Patented Dec. 28, 1948

2,457,188

UNITED STATES PATENT OFFICE 2,457,188

BENZOCAINE SOLUTION

Raymond Stone, Chicago, Ill., assignor to Americaine, Inc., Chicago, Ill., a corporation of Illinois No Drawing. Application May 24, 1945,
Serial No. 595,653

9 Claims. (Cl. 167—52)

This invention relates to anesthetic solutions, and more particularly to epithelial anesthetic solutions comprising benzocaine.

It has long been known that epithelial anesthetic solutions can be made by dissolving benzocaine in such nonvolatile solvents as castor oil, sesame oil, corn oil, olive oil, almond oil, and benzyl benzoate. However, these solvents are capable of dissolving only a relatively small amount of benzocaine. Consequently the anesthetic effect obtained from solutions made with these solvents is only of relatively short duration. It is therefore necessary to reapply these solutions at frequent intervals in order to assure continued absence of pain. Furthermore, while these solutions will anesthetize an open wound or mucous membrane, they have little or no anesthetic effect when applied to unbroken skin.

An object of the present invention is to provide a benzocaine solution adapted to provide anesthetic effect over a prolonged period of time without the necessity of reapplying the solution.

A further object is to provide an anesthetic solution having suitable anesthetic effect when applied to unbroken skin.

Other objects and advantages of this invention will become apparent as the following description progresses.

I have found certain solvents which are capable of forming solutions that contain as high as 10% or more benzocaine at 20° C. The use of solvents of high solvent power to dissolve small percentages of benzocaine has advantages over the use of poorer solvents for dissolving the same amount of benzocaine. One advantage is that the resulting solution may be subjected to much lower temperatures without precipitating any of the dissolved benzocaine. Another advantage is that solutions of benzocaine in these solvents of high solvent power exhibit more prolonged anesthetic effect than solutions of the same concentration in the poorer solvents which have heretofore been used. An explanation for this latter effect is that in solutions having equal concentration of benzocaine, the thermodynamic activity is least in the solvent having the greatest solvent power. But the rate at which benzocaine is absorbed by body tissues, body fluids, etc., varies directly with the thermodynamic activity of benzocaine in the solution. Consequently the benzocaine is absorbed more slowly and consequently over a longer period of time from dilute solutions of benzocaine made with these solvents of high solvent power than from solutions of the same concentration made with the less effective solvents.

Furthermore, more concentrated solutions of benzocaine in these solvents of high solvent power give anesthetic effects of still greater duration. In addition, and even more important, these solutions in concentration of approximately 10% or more are effective on unbroken as well as on broken skin so they can be used to relieve muscular pains and the pain caused by surface bruises, as well as pain caused by cuts and burns. They can also be used to relieve certain types of headache and to stop the itching of various forms of skin disease such as eczema and the like.

The fact that the more concentrated solutions in these superior solvents are effective on unbroken skin, whereas even nearly or completely saturated solutions in the poorer solvents are not effective on unbroken skin, may be due to the fact that the more concentrated solutions relinquish a relatively high concentration of benzocaine for a more prolonged period of time than do the solutions made with the less effective solvents.

These solvents should be substantially nonvolatile so that no evaporation will occur, which would cause precipitation of the benzocaine.

I have found that aliphatic polyoxyalkylene glycols and aliphatic ethers of aliphatic dihydric alcohols which have a boiling point not substantially less than 250° C. and in which the ratio of the total number of aliphatic ether groups per molecule to the molecular weight of the compound is not less than 0.0033, and aromatic ethers of aliphatic dihydric alcohols, and carboxylic acid esters of aliphatic dihydric alcohols, and carboxylic acid esters of aromatic and aliphatic ethers of aliphatic dihydric alcohols which have a boiling point not substantially less than 250° C. and in which the ratio of the total number of ether groups and ester groups per molecule to the molecular weight of the compound is not less than 0.0055 are sufficiently non-volatile and are capable of forming solutions which contain approximately 10% or more of benzocaine at 20° C.

The solvents described above which are particularly suitable have the following general formula:

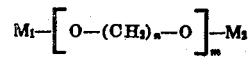

where $M_1$ and $M_2$ are hydrogen, or any organic radical, but preferably alkyl, alicyclyl, aryl, acyl, or aroyl; $n$ may be any whole number, $m$ may be any whole number except where $M_1$ and $M_2$ are both hydrogen in which case $m$ must be greater than one. Where $M_1$ or $M_2$ is hydrogen or any aliphatic group except acyl, the ratio of the total number of either groups per molecule to the molecular weight of the compound should be not less than 0.0033. Where $M_1$ or $M_2$ is acyl, aroyl, aryl, or any other aromatic radical, the ratio of the total number of ether and ester groups per molecule to the molecular weight of the compound should be not less than 0.0055.

The following table gives an exemplary list of non-volatile solvents for benzocaine, together with the ratio of the number of ether, ester or combination of ether and ester groups per molecule to the molecular weight of each compound and the corresponding approximate maximum solubility of benzocaine in the solvent.

Table

| Compounds | Molecular Weight | Approx. Solubility at 20° C. | Ether Groups | Ester Groups | R. |
|---|---|---|---|---|---|
| | | Per cent | | | |
| Methoxyl ethyl oleate | 340 | 11.0 | 1 | 1 | 0.0059 |
| Dimethoxy ethyl phthalate | 282 | 22.5 | 2 | 2 | 0.0142 |
| Diethoxy ethyl phthalate | 310 | 21 | 2 | 2 | 0.0129 |
| Dibutoxy ethyl phthalate | 366 | 17 | 2 | 2 | 0.0109 |
| Diethylene glycol | 106 | 23 | 1 | 0 | 0.0094 |
| Triethylene glycol | 150 | 29.5 | 2 | 0 | 0.0133 |
| Mixed polyethylene glycols | *200 | 32 | *3.1 | 0 | 0.0155 |
| Do | *300 | 34 | *5.4 | 0 | 0.0180 |
| Do | *400 | 36 | *7.7 | 0 | 0.0193 |
| Do | *600 | 36 | *12.2 | 0 | 0.0203 |
| Ethoxy triethylene glycol | 178 | 37 | 3 | 0 | 0.0169 |
| Tetrahydrofurfuryl ether of triethylene glycol | 234 | 29.5 | 3 | 0 | 0.0128 |
| Dimethoxy tetraethylene glycol | 222 | 44 | 5 | 0 | 0.0225 |
| Phenoxy triethylene glycol | 226 | 22 | 3 | 0 | 0.0133 |
| Methoxy triethylene glycol acetate | 206 | 33.5 | 3 | 1 | 0.0194 |
| Sorbitan ether of triethylene glycol monohexoate | 394 | 18 | 3 | 1 | 0.0102 |
| Triethylene glycol dihexoate | 346 | 19 | 2 | 2 | 0.0116 |
| Triethylene glycol dioctoate | 403 | 14 | 2 | 2 | 0.0099 |
| Dipropylene glycol | 134 | 19 | 1 | 0 | 0.0075 |
| Mixed polypropylene glycols | *150 | 25 | *1.45 | 0 | 0.0097 |
| Tripropylene glycol | 192 | 27 | 2 | 0 | 0.0104 |
| Sorbitan ether of tripropylene glycol | 338 | 22.5 | 3 | 0 | 0.0089 |
| Phenoxy dipropylene glycol | 210 | 17 | 2 | 0 | 0.0095 |
| Phenoxy tripropylene glycol propionate | 324 | 19 | 3 | 1 | 0.0123 |
| Phenoxy tetra propylene glycol propionate | 383 | 19 | 4 | 1 | 0.0131 |
| Phenoxy tripropylene glycol butyrate | 338 | 17 | 3 | 1 | 0.0118 |
| Phenoxy tetra propylene glycol butyrate | 397 | 18 | 4 | 1 | 0.0126 |
| Tetrahydrofurfuryl ether of tetrapropylene glycol monopropionate | 391 | 21.5 | 4 | 1 | 0.0128 |
| Cyclohexyl ether of tetrapropylene glycol monopropionate | 389 | 21.5 | 4 | 1 | 0.0129 |
| Propylene glycol monohexoate | 174 | 11 | 0 | 1 | 0.0058 |
| Ditetramethylene glycol | 162 | 17 | 1 | 0 | 0.0062 |
| Tritetramethylene glycol | 234 | 22 | 2 | 0 | 0.0085 |
| Decahydronaphthyl ether of ditetramethylene glycol | 298 | 18 | 2 | 0 | 0.0067 |
| Phenoxy tetramethylene glycol | 166 | 11.5 | 1 | 0 | 0.0060 |
| Phenoxy ditetramethylene glycol | 238 | 15 | 2 | 0 | 0.0084 |
| Phenoxy ditetramethylene glycol acetate | 280 | 18.5 | 2 | 1 | 0.0107 |
| Sorbitan ether of tetramethylene glycol monopropionate | 274 | 13.5 | 1 | 1 | 0.0073 |
| Dicyclohexyl ether of tetramethylene glycol sebacate | 513 | 14 | 2 | 2 | 0.0078 |
| Phenoxy heptamethylene glycol | 180 | 10 | 1 | 0 | 0.0055 |
| Tetrahydrofurfuryl ether of heptamethylene monobutyrate | 258 | 14 | 1 | 0 | 0.0078 |
| Dihexamethylene glycol | 218 | 13 | 1 | 0 | 0.0046 |
| Tetrahexamethylene glycol | 419 | 19 | 3 | 0 | 0.0072 |
| Sorbitan ether of hexamethylene glycol | 264 | 11 | 1 | 0 | 0.0038 |
| Decahydronaphthyl ether of hexamethylene glycol | 254 | 11.5 | 1 | 0 | 0.0039 |
| Cyclohexyl ether of dihexamethylene glycol | 301 | 18 | 2 | 0 | 0.0067 |
| Phenoxy dihexamethylene glycol | 294 | 12.5 | 2 | 0 | 0.0068 |
| Phenoxy hexamethylene glycol monoacetate | 236 | 15.5 | 1 | 1 | 0.0085 |
| Tetrahydrofurfuryl ether of hexamethylene glycol salicylate | 322 | 11.5 | 1 | 1 | 0.0062 |
| Phenoxy dihexamethylene glycol butyrate | 365 | 15 | 2 | 1 | 0.0082 |
| Dihexamethylene glycol mono-octoate | 344 | 10.8 | 1 | 1 | 0.0058 |
| Dioctamethylene glycol | 274 | 10.5 | 1 | 0 | 0.0037 |
| Ethoxy dioctamethylene glycol | 303 | 18 | 2 | 0 | 0.0066 |
| Sorbide ether of dioctamethylene glycol | 403 | 14 | 2 | 0 | 0.0050 |
| Phenoxy dioctamethylene glycol | 351 | 10.5 | 2 | 0 | 0.0057 |
| Phenoxy dioctamethylene glycol acetate | 393 | 14 | 2 | 1 | 0.0076 |
| Decahydronaphthyl ether of dioctamethylene glycol monoacetate | 453 | 12 | 2 | 1 | 0.0066 |
| Dioctamethylene glycol dioctate | 527 | 10.5 | 1 | 2 | 0.0057 |
| Dinonamethylene glycol | 303 | 10 | 1 | 0 | 0.0033 |
| Sorbide ether of nonamethylene glycol | 288 | 10.3 | 1 | 0 | 0.0035 |
| Ethoxy trinonamethylene glycol | 473 | 17 | 3 | 0 | 0.0064 |
| Phenoxy trinonamethylene glycol | 523 | 10.8 | 3 | 0 | 0.0058 |
| Phenoxy nonamethylene glycol octoate | 363 | 10 | 1 | 1 | 0.0055 |
| Tetrahydrofurfuryl ether of dinonamethylene glycol mono-octoate | 513 | 11 | 2 | 1 | 0.0059 |
| Octyl ether of undecane diol | 300 | 10 | 1 | 0 | 0.0033 |
| Cyclohexyl ether of dodecane diol | 285 | 10.4 | 1 | 0 | 0.0035 |

\* Denotes that the value is an average value.
R. Denotes the ratio of number of ether groups, ester groups, or combination of ether and ester groups per molecule to molecular weight.
The solubility in the table is given in per cent by weight of benzocaine in a substantially saturated solution at 20° C.

Any other polyoxyalkylene glycol or aliphatic ether of an aliphatic dihydric alcohol, or any other aromatic ether of an aliphatic dihydric alcohol or any other carboxylic acid ester of an aliphatic dihydric alcohol or of an aromatic or aliphatic ether of an aliphatic dihydric alcohol besides those listed in the table will be an effective solvent for benzocaine within the scope of this invention provided the ratio of the number of ether groups, ester groups or combination of ether and ester groups per molecule to the molecular weight of the compound is not less than the respective aforementioned limits.

Groups containing atoms other than carbon, hydrogen, and oxygen may also be present in these compounds. For example, sulfur containing groups such as sulfonic acid, thioether, sulfoxide, sulfone and the like, and nitrogen containing groups such as nitro, nitroso, amine, amide and the like may be present without rendering the solvent ineffective. Halogen may also be contained in these solvents but is not preferred because of its tendency to render the solvents somewhat toxic.

The solvents preferably should be liquids but solid compounds may be used provided the solid compound is dissolved in a liquid.

There is practically no operable lower limit of concentration for application of the anesthetic in the mouth or on broken skin, concentrations of .1% or less having an anesthetic effect depending on the time of contact and number of applications. However, for unbroken skin the lower limit of concentration for appreciable anesthetic effect is approximately 10%. There is no operable upper limit of concentration other than saturation. My preferred solutions have concentration of benzocaine of from approximately 10% by weight to saturation.

The epithelial anesthetic solution may be of any viscosity provided it is pourable or spreadable. However, in some applications it is preferable to utilize an anesthetic solution which is spreadable but not pourable so that it will not run off or be easily rubbed off. Waxy solid or semi-solid solvents may be used for making solutions of this type. However, in order to be spreadable the final viscosity of these solutions should not exceed 1500 Saybolt seconds at 70° C.

For example, a waxy polyoxyalkylene glycol such as polyethylene glycol having an average molecular weight of between approximately 850 and 4000 and ether and ester derivatives thereof, in which the ratio of the total number of ether groups, ester groups or combination of ether and ester groups per molecule to the molecular weight is within the aforementioned limits, is a suitable solvent for making a benzocaine solution which is spreadable but not pourable.

A suitable high viscosity solvent may also be made by mixing a waxy solid solvent of higher viscosity with a waxy solid solvent of lower viscosity and/or a liquid solvent. For example, a suitable solvent is made by mixing 18 parts of a polyethylene glycol having an average molecular weight of 4000 with six parts of a polyethylene glycol having an average molecular weight of 1000 and 9 parts of a polyethylene glycol having an average molecular weight of 300.

Both the liquid and the semi-solid water soluble polyoxyalkylene glycols are particularly suitable as solvents for benzocaine. Such, for example, are the polyethylene and polypropylene glycols. However, polyethylene glycols having a minimum average molecular weight of about 400 are preferable. Polyethylene glycols having an average molecular weight substantially less than 400 are very hygroscopic and consequently give a somewhat moist, unpleasant feeling when applied to the skin. Furthermore, if solutions of benzocaine in polyethylene glycols having a molecular weight substantially less than 400 are left exposed to a humid atmosphere, there is a danger that sufficient moisture might be absorbed to cause precipitation of the benzocaine. The use of the water soluble polyoxalkylene glycols as solvents for benzocaine has the following advantages:

1. They are non-toxic and non-irritating.
2. They make it possible to form solutions containing very high concentration of benzocaine.
3. They are non-staining.
4. Because they are water soluble, they can be easily removed with water. Furthermore, when solutions of benzocaine in a water soluble polyoxyalkylene glycol are applied to an open wound, the polyoxyalkylene glycol dissolves in the body exudates and thus lowers their surface tension. This facilitates the penetration of the benzocaine into the wound.

Antiseptic agents such as oxyquinoline benzoate, phenol and the like, compounds designed to hasten healing or to assist in curing various forms of skin disorders such as mono- or diacetyl amino-azo-toluene or chlorophyll, other anesthetics such as cocaine, butesin, butyn base, nupercaine base and the like, vaso-constrictors such as ephedrine or epinephrin, or other therapeutic agents may be added to these solutions.

To more clearly set forth the practice in accordance with the invention and to more specifically point out the nature of the product and process contemplated thereby, several specific, illustrative examples are hereinafter set forth, it being understood that these examples illustrate several embodiments which have given satisfactory results and are not intended to restrict the invention thereto.

*Example I*

| | Parts |
|---|---|
| Benzocaine | 19 |
| Phenoxy tripropylene glycol propionate | 80.7 |
| Oxyquinoline benzoate | 0.3 |

*Example II*

| | Parts |
|---|---|
| Benzocaine | 20 |
| Mixed polyethylene glycols (average molecular weight 300) | 78 |
| Diacetyl-amino-azo-toluene | 2 |

*Example III*

| | Parts |
|---|---|
| Benzocaine | 23 |
| Butesin | 1 |
| Tripropylene glycol | 76 |

*Example IV*

| | Parts |
|---|---|
| Benzocaine | 18 |
| Phenoxy ditetramethylene glycol acetate | 80 |
| Phenol | 1 |
| Ephedrine | 1 |

It is sometimes desirable to employ water emulsions of my water insoluble epithelial anesthetic solutions. Such emulsions make it possible to incorporate water soluble therapeutic agents which are insoluble in the epithelial anesthetic solutions. Again, these epithelial anesthetic emulsions can be used to make washable anesthetic ointments by incorporating them in a suitable washable ointment base.

The following is an example of the formation of an emulsion of one of my epithelial anesthetic solutions:

*Example V*

19 parts of benzocaine were dissolved in 81 parts of triethylene glycol dihexoate at 50° C. This constituted the oil phase of the emulsion.

5 parts of diethylene glycol monostearate and 5 parts of glaurin (a polymerized glycol ester of mixed fatty acids) were emulsified in 40 parts of water at 50° C. with rapid stirring. This constituted the water phase.

The oil phase was then added to the water phase at 50° C. with moderate stirring. A stable emulsion formed.

Water soluble therapeutic agents such as urea, chlorophyll, allantoin, ichthammol, and the like may be added directly to this emulsion, or as a water soluble.

The following is an example of the preparation of an epithelial anesthetic emulsion which is particularly suitable for incorporating in a washable ointment base.

*Example VI*

21.0 parts of benzocaine were dissolved in 79.0 parts of dimethoxy ethyl phthalate at 50° C. To this solution were added at the same temperature 3.1 parts of sorbitan monolaurate and 4.7 parts of the laurate ester of a polyalkylated sorbitan.

The solution was allowed to cool, after which 76.0 parts of distilled water were added with rapid stirring.

A milky white emulsion formed.

*Example VII*

A suitable washable ointment base was made as follows:

1.5 parts of sodium lauryl sulfate were dissolved in 40 parts of water. This constituted the water phase.

The oil phase consisted of 12.8 parts of cetyl alcohol, 14.3 parts of petroleum jelly and 10 parts of liquid petrolatum. This was heated to 60° C. and added to the water phase at the same temperature with rapid stirring. A white washable ointment base formed.

A washable anesthetic ointment was made by incorporating 1 part of the epithelial anesthetic emulsion, as described above, into two parts of the washable ointment base.

Of course other emulsifying agents and other washable ointment bases, well known to those skilled in the art, may be employed, and other therapeutic agents such as those already mentioned may be incorporated in the ointment along with the benzocaine The term "aromatic" as used in this specification and claims is intended to include heterocyclic compounds in which the heterocyclic group is aromatic in character, and the term "aliphatic" includes alicyclic compounds, and heterocyclic compounds in which the heterocyclic group is aliphatic in character.

While I have described certain preferred embodiments of my invention, many modifications thereof may be made without departing from the spirit of the invention; and I do not wish to be limited to the detailed examples, formulas and proportions of ingredients herein set forth, but desire to avail myself of all changes within the scope of the appended claims.

I claim:

1. An epithelial anesthetic solution comprising at least 10% by weight of benzocaine base dissolved in a solvent predominantly comprising a solvent having a boiling point not substantially less than 250° C. and selected from the group consisting of aliphatic polyoxyalkylene glycols and aliphatic ethers of dihydric alcohols, the ratio of the total number of aliphatic ether groups per molecule to the molecular weight of the compound being not less than 0.0033; aromatic ethers of aliphatic dihydric alcohols, carboxylic acid esters of aliphatic dihydric alcohols, and carboxylic acid esters of aromatic and aliphatic ethers of aliphatic dihydric alcohols, the ratio of the total number of ether groups and ester groups per molecule to the molecular weight of the compound being not less than 0.0055.

2. An epithelial anesthetic solution comprising at least 10% of benzocaine base dissolved in a solvent predominantly comprising an ether of aliphatic dihydric alcohol having a ratio of the total number of ether groups per molecule to the molecular weight of not less than 0.0033.

3. An epithelial anesthetic solution comprising at least 10% by weight of benzocaine base dissolved in a solvent predominantly comprising an aliphatic polyoxyalkylene glycol in which the ratio of the number of ether groups to the molecular weight of the glycol is not substantially less than 0.0033.

4. An epithelial anesthetic solution comprising at least 10% by weight of benzocaine base dissolved in a solvent predominantly comprising a polyethylene glycol.

5. An epithelial anesthetic solution comprising at least 10% by weight of benzocaine base dissolved in a polyethylene gylcol having an average molecular weight of not substantially less than 400.

6. An epithelial anesthetic solution comprising at least 10% by weight of benzocaine base dissolved in a polyethylene gycol having an average molecular weight between approximately 850 and 4000.

7. An epithelial anesthetic solution comprising at least 10% by weight of benzocaine base dissolved in triethylene glycol dihexoate.

8. An epithelial anesthetic solution comprising at least 10% by weight of benzocaine base dissolved in dimethoxy ethyl phthalate.

9. An epithelial anesthetic solution comprising at least 10% by weight of benzocaine base dissolved in a solvent predominantly comprising an ester of a dihydric alcohol having a ratio of the total number of oxygen linked groups per molecule to the molecular weight of not less than 0.0055.

RAYMOND STONE.

REFERENCES CITED

The following references are of record in the file of this patent:

UNITED STATES PATENTS

| Number | Name | Date |
| --- | --- | --- |
| 2,045,125 | Curtis | June 23, 1936 |
| 2,149,005 | Bockmühl | Feb. 28, 1939 |
| 2,352,691 | Curtis | July 4, 1944 |

OTHER REFERENCES

Chemical Engineering News, vol. 23, Feb. 10, 1945, page 250.

Synthetic Organic Chemicals (Carbide and Carbon Chemicals Corp.), October 15, 1940, page 67.

Chemical and Engineering News, vol. 22, page 418 (March 25, 1944).

The Merck Manual (1934), page 1302.

Journal of the American Dental Association, vol. 30, November 15, 1943, page 1955.

Goodman, Cosmetic Dermatology (1936), page 16.

Extra Pharmacopeia, 22d ed. (1941), vol. 1, page 429.

Certificate of Correction

Patent No. 2,457,188.                                              December 28, 1948.

RAYMOND STONE

It is hereby certified that error appears in the printed specification of the above numbered patent requiring correction as follows:

Column 7, line 9, for the word "soluble" read *solution*;

and that the said Letters Patent should be read with this correction therein that the same may conform to the record of the case in the Patent Office.

Signed and sealed this 10th day of May, A. D. 1949.

[SEAL]

THOMAS F. MURPHY,
*Assistant Commissioner of Patents.*